(12) United States Patent
Reed

(10) Patent No.: US 6,552,739 B1
(45) Date of Patent: Apr. 22, 2003

(54) WIRE-MESH SELECTION INTERNET WEBSITE

(76) Inventor: George Reed, 639 Vicente Ave., Berkeley, CA (US) 94710

( * ) Notice: Subject to any disclaimer, the term of this patent is extended or adjusted under 35 U.S.C. 154(b) by 0 days.

(21) Appl. No.: 09/507,474

(22) Filed: Feb. 17, 2000

(51) Int. Cl.⁷ .............................................. G06F 17/60

(52) U.S. Cl. ........................................ 345/854; 705/20

(58) Field of Search ................................. 345/762, 765, 345/854, 244; 705/20, 24, 25, 26

(56) References Cited

U.S. PATENT DOCUMENTS

| | | | | |
|---|---|---|---|---|
| 6,031,471 A | * | 2/2000 | Wilson | 345/156 |
| 6,249,772 B1 | * | 6/2001 | Walker et al. | 705/26 |
| 6,304,855 B1 | * | 10/2001 | Burke | 705/27 |

* cited by examiner

Primary Examiner—Cao H. Nguyen
(74) Attorney, Agent, or Firm—Glenn Patent Group; Michael A. Glenn; Julia Thomas (57) ABSTRACT

The present invention is an Internet wire-mesh merchandising system that comprises a webserver for generating a web presence. Potential customers looking to select and buy wire mesh are allowed to log-on to a website operated by a wire-mesh retailer, distributor, and manufacturer. An HTML product page includes navigation buttons that link to other HTML product pages. Each page further includes JPG or GIF type pictures that allow the shopper to see a particular wire mesh product corresponding to a presently displayed HTML product page. A group of alternate-view buttons link to other pictures of the same product that show variations or different perspectives. A set of four navigation buttons permit the shopper to hyperlink to HTML product pages where the wire mesh is finer, coarser, thinner, and thicker. Once the link is taken, a graphic is presented that corresponds to the selected wire-mesh. The list of hyperlinks includes only those HTML product pages that represent available combinations of wire-mesh material, wire size, and mesh count. A "price" and an "order" hypertext allow the shopper to see the product price for the selected item and to order it electronically.

17 Claims, 7 Drawing Sheets

| NEW | FOLDER NAME | 008X008G017.HTML | 502 | | 504 |

PAGE IDENTITY http://www.TWPINC.com/008X008G017.html DON'T FILL THIS IN

| CATEGORY | Hot Dipped Galvanized Wire Mesh |
|---|---|
| DESCRIPTION | 8 Mesh .017 Wire Diameter |
| PART NUMBER | ○ 008X008G017 |
| PRIMARY PHOTO I.D. NUMBER MVC | 248 |
| RULER SIZE | 3" x 2" |
| holes shown left to right | 24 |
| holes shown top to bottom | 16 |
| ABOVE PHOTO COMMENT | |
| ABOVE PHOTO COMMENT LINK | |
| comments done | no |

NO LINK NONE
LINK TO NEXT FINER WEAVE IN THIS CATAGORY

LINK TO NEXT HEAVIER WIRE DIAMETER IN THIS CATAGORY
NO LINK
NONE

LINK TO NEXT LIGHTER WIRE DIAMETER IN THIS CATAGORY
008X008G013
250

004X004D025
LINK TO NEXT CORSER WEAVE IN THIS CATAGORY
251

COMMENTS

Pictured above is extra heavy commercial grade 8 mesh, 27 guage, hot-dipped galvanized woven hardware cloth. TWP can also slit and cut this material to size. Further characteristics of this zinc-coated steel mesh is provided on an information page. This mesh is also available in a superior galvanized grade. Similar mesh is available in S/S Welded.

price table comments | Prices are in U.S. dollars per roll. Rolls are 100 feet in length. Inquire about larger quantity pricing. Various warehouses and excellent freight programs are available.

| ALTERNATE VIEW #1 | NO LINK AVAILABLE YET |
|---|---|
| ALTERNATE VIEW #2 | NO LINK AVAILABLE YET |
| DATA EXCEL SPREAD SHEET NAME | 008X008G017DATA |
| PRICING EXCEL SPREAD SHEET NAME | 008X008G017PRICES |
| DISC EXCEL SPREAD SHEET NAME | 008X008G017discs |

Fig. 6

```
┌──────────────────────────────────────────────────────────────────────────┐
│  [ NEW ]   FOLDER NAME  [008X008G017.HTML] ─602                          │
│                                                          ,604            │
│ PAGE IDENTITY  http://www.TWPINC.com/002X002D041.html    DON'T           │
│                                                          FILL            │
│                                                          THIS IN         │
└──────────────────────────────────────────────────────────────────────────┘
```

600

CATEGORY  [Hot Dipped Galvanized Wire Mesh]
DESCRIPTION  [2 Mesh .041 Wire Diameter]
PART NUMBER  ○ [002X002D041]
PRIMARY PHOTO I.D. NUMBER MVC [253]
RULER SIZE  [3" x 2"]
holes shown left to right  [6]
holes shown top to bottom  [4]
ABOVE PHOTO COMMENT  [ ]
ABOVE PHOTO COMMENT LINK  [ ]
comments done  [no]

[004X004G035]          [252]
LINK TO NEXT FINER WEAVE IN THIS
CATAGORY

LINK TO NEXT HEAVIER WIRE
DIAMETER
IN THIS CATAGORY
[002X002D063]
                                LINK TO NEXT LIGHTER WIRE
                                DIAMETER
                                IN THIS CATAGORY
            [264]                [NO LINK]
                                         [NONE]

[NO LINK]
LINK TO NEXT CORSER WEAVE IN THIS
CATAGORY                         [NONE]

COMMENTS

Pictured above is extra heavy commercial grade 2 mesh, 19 guage, hot-dipped galvanized woven hardware cloth. TWP can also slit and cut this material to size. Further characteristics of this zinc-coated steel mesh is provided on an information page. This mesh is also available in a superior galvanized grade. Similar mesh is available in S/S Welded.

price table comments  | Prices are in U.S. dollars per roll. Rolls are 100 feet in length. Inquire about larger quantity pricing. Various warehouses and excellent freight programs are available.

ALTERNATE VIEW#1  [NO LINK AVAILABLE YET]
ALTERNATE VIEW#2  [NO LINK AVAILABLE YET]
DATA EXCEL SPREAD SHEET NAME  [002X002D041DATA]
PRICING EXCEL SPREAD SHEET NAME  [002X002D041PRICES]
DISC EXCEL SPREAD SHEET NAME  [002X002D041discs]

| NEW | FOLDER NAME | 004X004D025.HTML | 702 | 704 |

PAGE IDENTITY http://www.TWPINC.com/004X004D025.html  DON'T FILL THIS IN

CATEGORY: Hot Dipped Galvanized Wire Mesh
DESCRIPTION: 4 Mesh .025 Wire Diameter
PART NUMBER: ○ 004X004D025
PRIMARY PHOTO I.D. NUMBER MVC: 251
RULER SIZE: 3" x 2"
holes shown left to right: 12
holes shown top to bottom: 8
ABOVE PHOTO COMMENT:
ABOVE PHOTO COMMENT LINK:
comments done: no

008X008G017    248
LINK TO NEXT FINER WEAVE IN THIS CATAGORY

LINK TO NEXT HEAVIER WIRE DIAMETER IN THIS CATAGORY
004X004G035
252

LINK TO NEXT LIGHTER WIRE DIAMETER IN THIS CATAGORY
NO LINK
NONE

002X002D041
LINK TO NEXT CORSER WEAVE IN THIS CATAGORY    253

COMMENTS

Pictured above is extra heavy commercial grade 4 mesh, 23 guage, hot-dipped galvanized woven hardware cloth. TWP can also slit and cut this material to size. Further characteristics of this zinc-coated steel mesh is provided on an information page. This mesh is also available in a superior galvanized grade. Similar mesh is available in S/S Welded.

price table comments: Prices are in U.S. dollars per roll. Rolls are 100 feet in length. Inquire about larger quantity pricing. Various warehouses and excellent freight programs are available.

ALTERNATE VIEW#1: NO LINK AVAILABLE YET
ALTERNATE VIEW#2: NO LINK AVAILABLE YET
DATA EXCEL SPREAD SHEET NAME: 004X004D025DATA
PRICING EXCEL SPREAD SHEET NAME: 004X004D025PRICES
DISC EXCEL SPREAD SHEET NAME: 004X004D025discs

WIRE-MESH SELECTION INTERNET WEBSITE

BACKGROUND OF THE INVENTION

1. Technical Field

The present invention relates to Internet websites, and more specifically to web pages organized in such a way that a user can browse through all the available types of wire mesh products of a particular supplier and select one for purchase.

2. Description of the Prior Art

Wire mesh and wire cloth come in many different combinations of weave, material, mesh sizes, wire diameters, and welding. Although hundreds or thousands of different combinations are possible, it may not be practical for a particular supplier to offer all the combinations. Some combinations of weave, material, mesh sizes, wire diameters, and welding are also not manufacturable, e.g., a wire diameter that is so large the mesh openings are closed up or exceeded.

Buyers can often make ordering mistakes in selecting a wire mesh or wire cloth because the impossible or unavailable combinations are sometimes too subtle to understand. Ordering the wrong thing can be frustrating for all those involved. The Internet now makes it possible for users to log onto a business' website to select and order products.

Suppliers like TWP, Inc. (Berkeley, Calif.) offer at least three families of mesh materials, e.g., woven wire mesh, welded stainless steel mesh, and galvanized hardware cloth. The woven wire mesh includes a range of traditional to ultra-fine, high-tech alloy, screen materials. The welded stainless steel mesh is a strong, precise material with an accurate grid pattern and relatively large holes. The galvanized hardware cloth includes a range of steel mesh protected by a heavy-duty zinc coating, e.g., for use in outdoor and industrial environments. Such materials are conventionally stocked in 36-inch and 48-inch wide rolls in 100-foot lengths. But rolls up to 300-inches wide can be bought on special order.

Wire cloth is the proper name for what is commonly called screen or mesh. Such material is known for its high strength, wear resistance, ability to withstand high temperatures, and long service life. Wire cloth is woven like textile cloth. So-called market grade wire cloth are woven wire meshes suitable for general purpose work.

Materials that can be used include stainless steel type 304, brass, copper. A line of special woven meshes are available in stainless steel type 316, aluminum, bronze, inconel, nickel, steel and epoxy-coated steel. The user's choice of metal is determined by the product-operation environment and constraining cost considerations.

The wire-mesh hole size, e.g., the distance between two adjacent parallel wires, is a function of both the mesh count and wire diameter. Changing either will change the opening size. The usual opening sizes vary from one-inch openings down to microscopic. The choice of a wire-mesh opening size is determined by the desired sizes of objects to be retained or allowed to pass through. The mesh is the number of openings in a linear inch, measured from the center of one wire to a point one-inch distant.

Two weaves are conventionally available, plain and twilled. The plain weave has an over-one/under-one weave. Such type of wire cloth has square or rectangular openings, and is the simplest and most common weave used in screening and separating applications. The twilled weave is woven with an over-two/under-two weave with wedge-shaped openings. Such weave is generally considered stronger than plain weave and is often used in filtration.

The typical welded stainless steel wire mesh is formed of wires that are fused together at their junctions into a grid. Automatic welding looms are used that accurately position all the shorter (weft) wires over the longer (warp) wires and spot-weld the intersections. These special looms can produce strong, consistent welds without any burning or discoloration.

The standard welded-stainless-steel-wire-mesh material is type 304 stainless steel because of its high corrosion resistance and strength at elevated temperatures. Type 304 stainless steel is also referred to as "18-8", meaning eighteen percent chromium (18% Cr) and eight percent nickel (8% Ni). TWP, Inc. also provides stainless steel types 304L, 316, 316L and other stainless alloys on request.

Standard welded wire mesh openings are always square or rectangular, and range from 0.218 inch to 0.979 inch. Meshes from 4-mesh to 1-mesh are usually stocked, and much larger meshes with up to 10-inch openings and 0.393 inch wire diameter can be obtained on special order.

Galvanized hardware cloth is typically used in partitions, grills, vents, cages and guards, wherever economical, sturdy, corrosion-resistant material is required. Galvanized hardware cloth is a lightweight, economical steel mesh that is protected from atmospheric corrosion by the application of a heavy duty zinc coating, e.g., hot-dip galvanizing. The zinc coating encapsulates the mesh for excellent corrosion protection and a firm, non-raveling product.

The hardware cloth openings are relatively large compared to those of woven mesh, e.g., they range from 0.108 inch to 0.459 inch. The galvanizing process slightly decreases the opening size by about 0.004–0.006 inches. Several special hardware cloth specifications called vent meshes offer larger open areas for increased air flow rates. Readily available galvanized hardware cloth is stocked in 2-mesh, 4-mesh, and 8-mesh. Other special meshes are manufactured as required. The 2-mesh and 4-mesh is available woven or welded and the 8-mesh hardware cloth is woven.

SUMMARY OF THE INVENTION

An Internet wire-mesh merchandising system embodiment of the present invention comprises a webserver that generates a web presence. Potential customers looking to select and buy wire mesh are allowed to log-on to a website operated by a wire-mesh retailer, distributor, and manufacturer. An HTML product page includes navigation buttons that link to other HTML product pages. Each page further includes JPG or GIF type pictures that allow the shopper to see a particular wire mesh product corresponding to a presently displayed HTML product page. A group of alternate-view buttons link to other pictures of the same product that show variations or different perspectives. A set of four navigation buttons permit the shopper to hyperlink to HTML product pages where the wire mesh is finer, coarser, thinner, and thicker. Once the link is taken, a graphic is presented that corresponds to the selected wire-mesh. The list of hyperlinks includes only those HTML product pages that represent available combinations of wire-mesh material, wire size, and mesh count. A "price" and an "order" hypertext allow the shopper to see the product price for the selected item and to order it electronically.

DETAILED DESCRIPTION OF THE INVENTION

Figure 1:
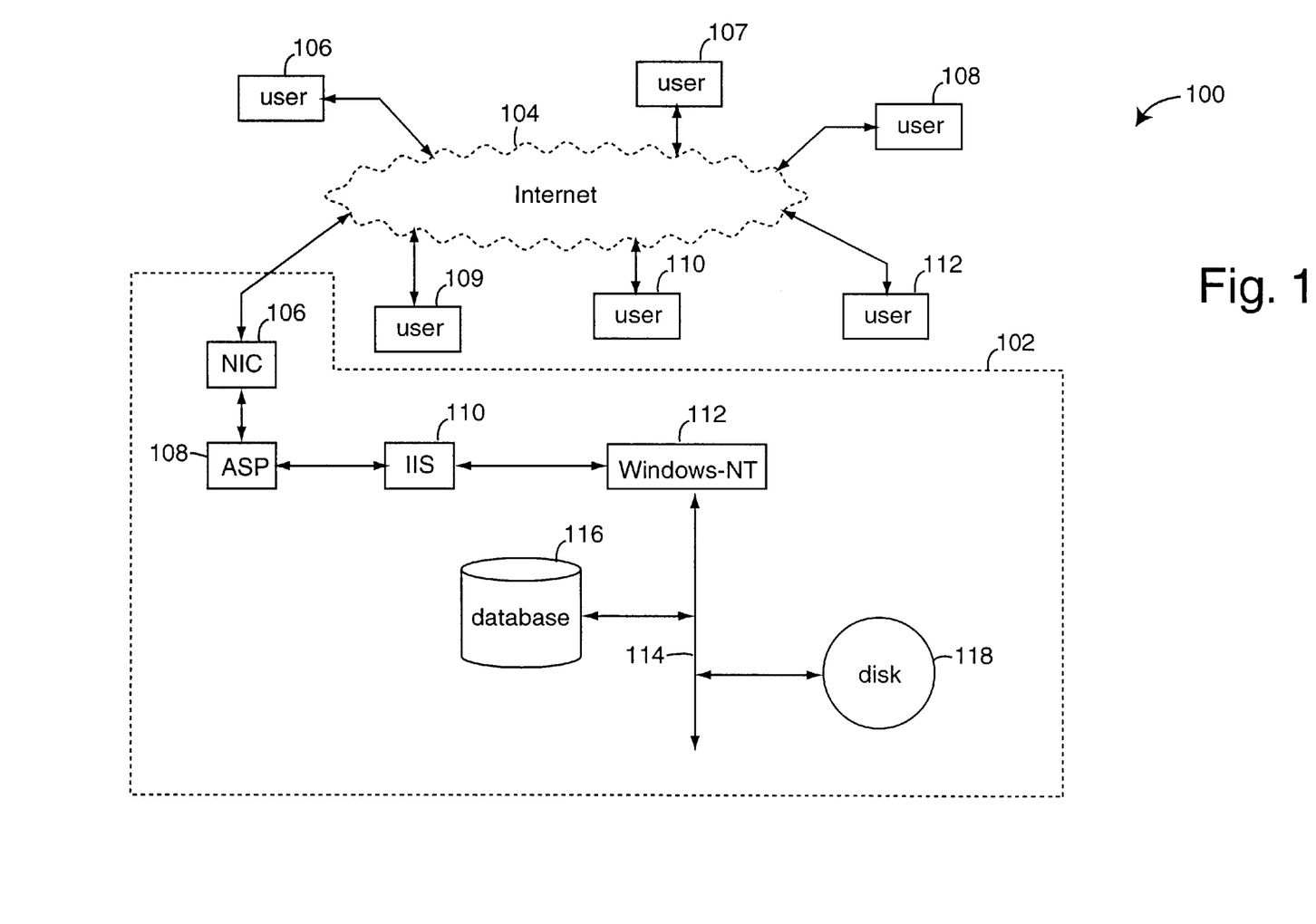
FIG. 1 is a functional block diagram of an Internet wire-mesh merchandising system embodiment of the present invention.

FIG. 1 illustrates an Internet wire-mesh merchandising system embodiment of the present invention, referred to herein by the reference numeral 100. The system 100 comprises a webserver 102 connected to the Internet 104 and many clients or shoppers 106–112. The webserver 102 interfaces to the Internet 104 with a network interface controller (NIC) 106. An interactive webpage user interface 108 provides functionality similar to Microsoft Corporation (Redmond, Wash.) Active Server Pages (ASP). An Internet file and application server 110, such as Microsoft Internet Information Server (IIS), runs under control of an operating system 112, e.g., Microsoft Windows-NT server. The ASP 108 and IIS 110 together generate a web presence on the Internet. An expansion bus 114 supports a database 116 and a general purpose storage disk 118. Various Microsoft Windows-NT services can run without requiring a user to be logged on to the system, e.g., Microsoft SQL Server, Microsoft Exchange Server, Dynamic Host Interface Protocol (DHCP), and even Windows Internet Name Service (WINS) servers. These are preferably stored in disk 118.

Figure 2:
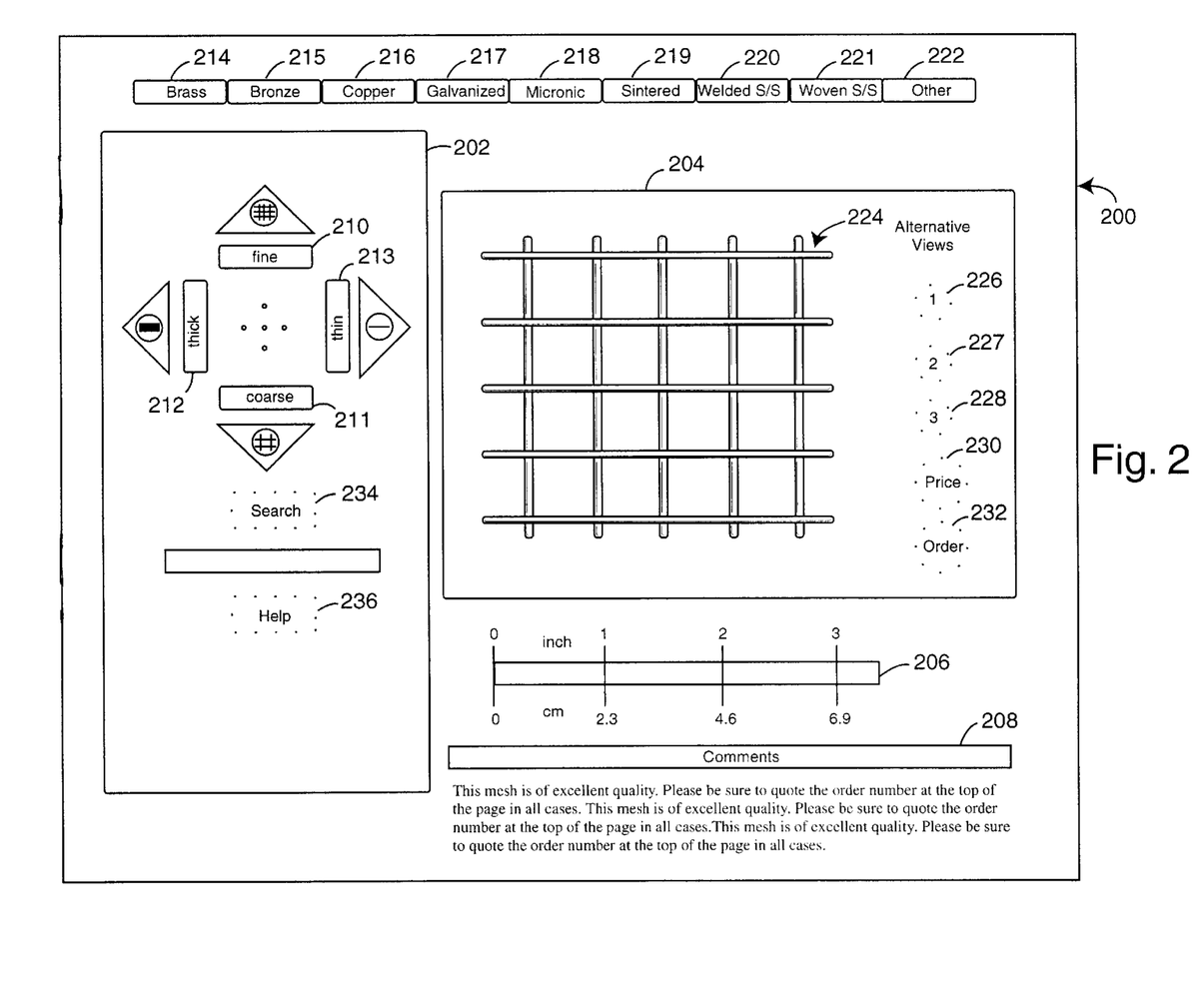
FIG. 2 is a diagram of a graphical user interface for an HTML product page as it presents on a web browser operated by a user at a network client site.

FIG. 2 represents a graphical user interface (GUI) 200 that is presented to an Internet user on a web browser, e.g., Netscape Communicator and Microsoft Internet Explorer. Such GUI is generated by the ASP 108 and IIS 110 (FIG. 1) when the user logs on to the uniform resource locator (URL) address of the website operator. The GUI 200 includes a navigation window 202, a sample-picture window 204, a ruler 206 for scale, and a comments field 208. The navigation window 202 permits the user to navigate through wire-mesh product samples that have finer mesh, coarser mesh, thicker wires, and thinner wires, e.g., by clicking on a set of hyperlink buttons 210–213, respectively. The materials used in the wire-mesh product pictured in window 204 can be selected by dicking on any of several buttons 214–222, e.g., Brass, Bronze, Copper, Galvanized, Micronic, Sintered, Welded Stainless Steel (S/S), Woven Stainless Steel, and Other. It may occur that meshes and wire sizes available in one material may not be available in another material. Amplifying remarks about the wire-mesh product currently selected are provided in the comments field 208.

The website design is such that the discrete products the user can view are those that the seller operating webserver 102 is offering for sale, or at least are those that the seller can actually produce and deliver.

The ruler 206 is a scale provided for the user to understand a picture 224 of a wire-mesh product being presented in window 204. Alternative views of the product, if available, can be accessed by clicking on a set of alternative view buttons 226–228. Such alternate views are presented instead of an initial sample product in picture 224. If the user is curious about the price of the product currently displayed in picture 224, a price button 230 is used to go to a webpage with current pricing. An order button 232 can be clicked-on to take the user to a product ordering webpage. A search button 234 and a help button 236 are provided for navigation help.

Figure 3:
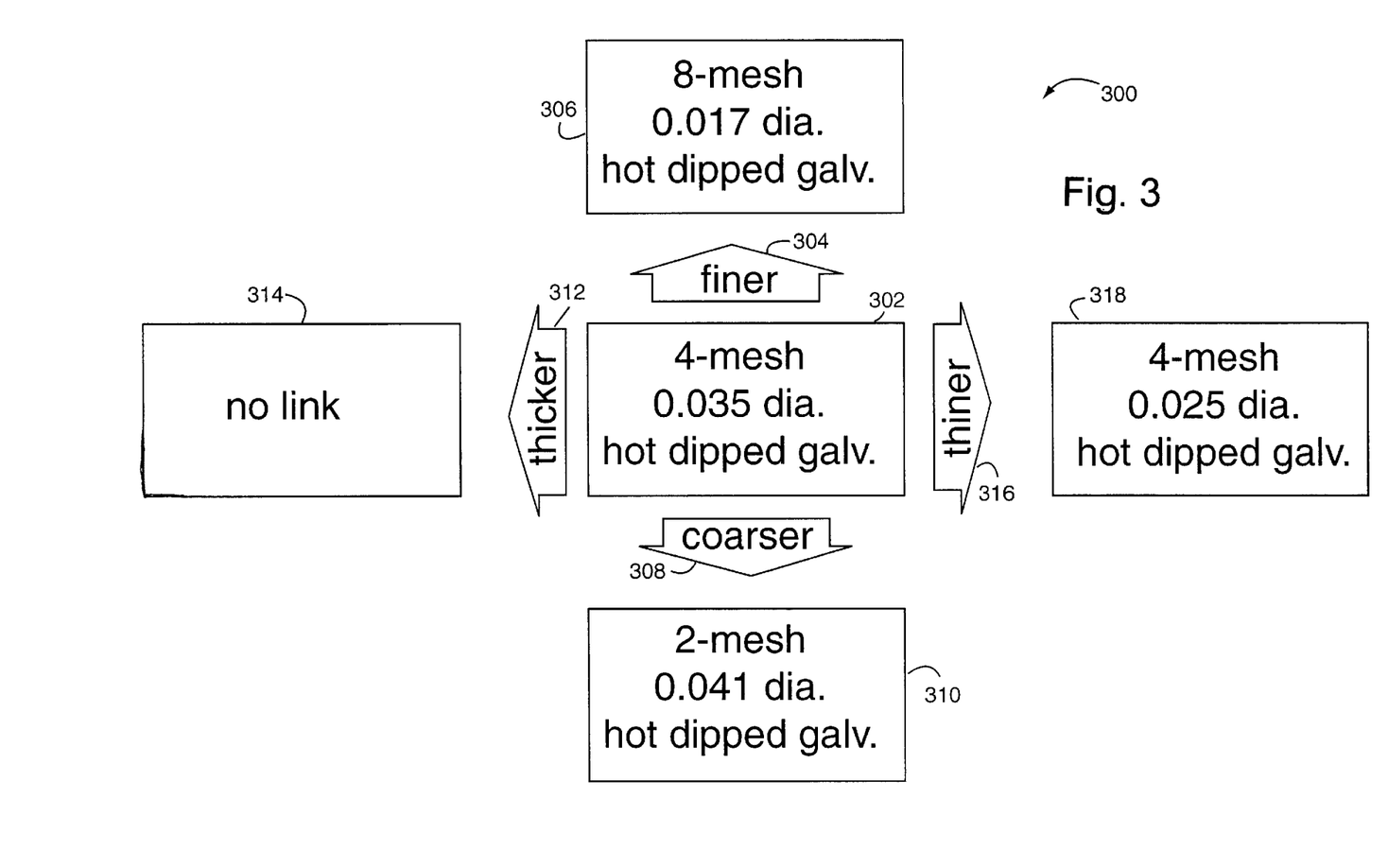
FIG. 3 is a flow diagram that represents the navigation that occurs between HTML product pages as a result of a user clicking on any of four hyperlink buttons for finer, coarser, thicker, and thinner.

A dataflow 300 in FIG. 3 represents the effects of the finer-mesh, coarser-mesh, thicker-wires, and thinner-wires hyperlink buttons 210–213 (FIG. 2). For example, a starting position 302 is for a hot-dipped galvanized 4×4 mesh with 0.035" diameter wire. A finer navigation-direction 304 takes the user to a hot-dipped galvanized 8-mesh with 0.017" diameter wire in a position 306. Such represents the only choice for finer mesh from the starting position 302, a thinner wire is necessitated by requesting a finer (higher count) mesh. A coarser navigation-direction 308 takes the user to a hot-dipped galvanized 2-mesh with 0.041" diameter wire in a position 310. Such represents the only choice for coarser mesh from the starting position 302. A thicker wire is not necessitated by requesting a coarser (lower count) mesh, but the thicker 0.041" diameter wire represents the only product configuration the seller chooses to produce and sell. A thicker navigation-direction 312 points to a no-link position 314. Such occurs when there is no available product choice in that direction. A thinner navigation-direction 316 takes the user to a hot-dipped galvanized 4-mesh with 0.025" diameter wire in a position 318. Such represents the next choice for thinner-wire mesh from the starting position 302. The mesh count remains at 4-mesh.

The dataflow 300 in FIG. 3 can be used by a web designer in implementing embodiments of the webserver 102 (FIG. 1). A more detailed implementation would be assisted by creating webpage fill-in forms like those illustrated in FIGS. 4–7. A commercially marketed computer program sold by FileMaker, Inc., called FILEMAKER-PRO, provided good results for such forms.

Figure 4:
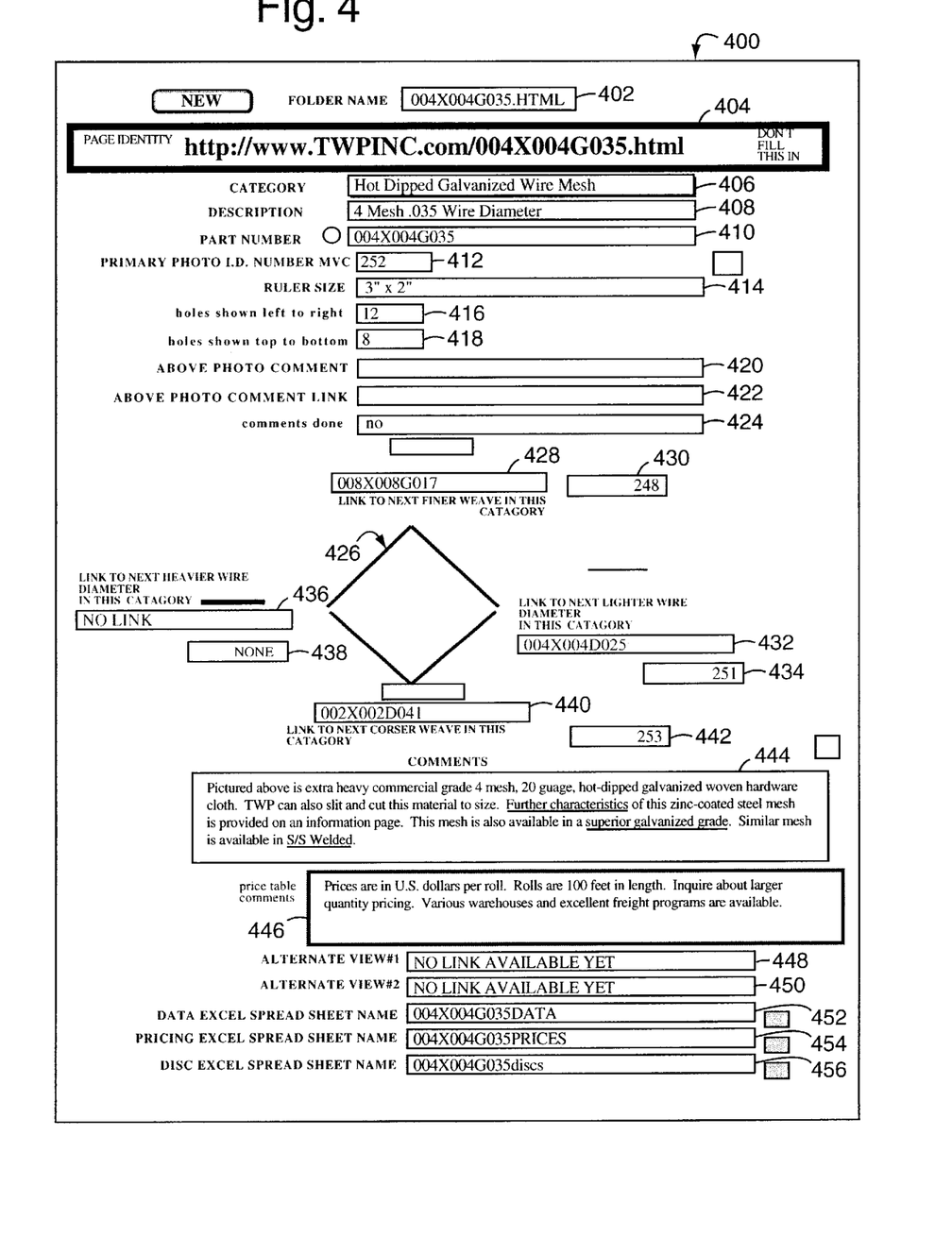
FIG. 4 is a diagram that represents a design form for a HTML product page, e.g., for a "004X004G035" wire-mesh product, and such is used by a webpage designer as a tool for HTML coding.

FIG. 4 diagrams a form 400 that corresponds to the implementation of position 302 (FIG. 3). A folder name 402 is filled-in with "004X004G035.HTML", e.g., the hypertext mark-up language (HTML) for 4×4 mesh galvanized 0.035" diameter. A URL 404 designates where the HTML file will be found on the Internet, e.g., ". . . /004X004G035.html". This is read, using hypertext transfer protocol, within the world wide web, at TWPINC.com, file 004X004G035.html. In actuality, a domain name server (DNS) coverts the "TWPINC.com" part to a four-place Internet protocol (IP) address in the form "00.00.00.00". A category box 406 allows for a common grouping, e.g., "Hot Dipped Galvanized Wire Mesh". A description box 408 is used to enter the common product name, e.g., "4-Mesh 0.035 Wire Diameter". A part number box 410 provides information necessary to order this product, e.g., "004X004G035". A photo-ID box 412 identifies which GIF or JPG picture file relates to this particular product, e.g., "252". Such information is used to control what appears in product picture 224 (FIG. 2). A ruler-size box 414 is filled in with information that corresponds to the scale used in the picture file recited in photo-ID box 412. For example, "3 by 2 inches". A horizontal dimension box 416 is filled-in with the number of holes, left-to-right, represented in the product picture. A vertical dimension box 418 is filled-in with the number of holes, top-to-bottom, represented in the product picture. A photo-comment box 420 provides for comments about the product picture. A photo-comment link box 422 provides for a file or URL link to information about the product picture. A comments-done? box 424 allows work-in-progress to be marked.

A four-way navigation symbol 426 signals the four directions a user can navigate, and corresponds to navigation window 202, especially buttons 210–213 (FIG. 2). A next-finer weave box 428 indicates a product description, file, or URL to be taken, e.g., "008X008G017". A next-link photo box 430 corresponds to the item in the next-finer weave box 428. A next-lighter-wire box 432 indicates a product description, file, or URL to be taken, e.g., "004X004D025". A next-link photo box 434 corresponds to the item in the next- lighter-wire box 432. A next-heavier-wire box 436 indicates a product description, file, or URL to be taken, e.g., "no-link". See, position 314 (FIG. 3). A next-link photo box 438 corresponds to the item in the next-heavier-wire box 436. A next-coarser weave box 440 indicates a product description, file, or URL to be taken, e.g., "002X002D041". A next-link photo box 442 corresponds to the item in the next-coarser weave box 440. A comments box 444 includes remarks that the webpage designer wants to appear in the comments field 208 (FIG. 2). Similarly, a price-table comments box 446 includes remarks that the webpage designer wants to appear when prices are quoted. An afternate view-1 box 448 is used for alternative product photos that will be displayed as picture 224 in response to dicking on button 226 (FIG. 2). An alternate view-2 box 450 is used for alternative product photos that will be displayed as picture 224 in response to clicking on button 228 (FIG. 2). An Excel spreadsheet name box 452 is used to link to a corresponding data file. A pricing Excel spreadsheet name box 454 is used to link to a corresponding prices file, e.g., as would be invoked in response to clicking button 230 (FIG. 2). A disc Excel spreadsheet name box 456 is included.

Figure 5:
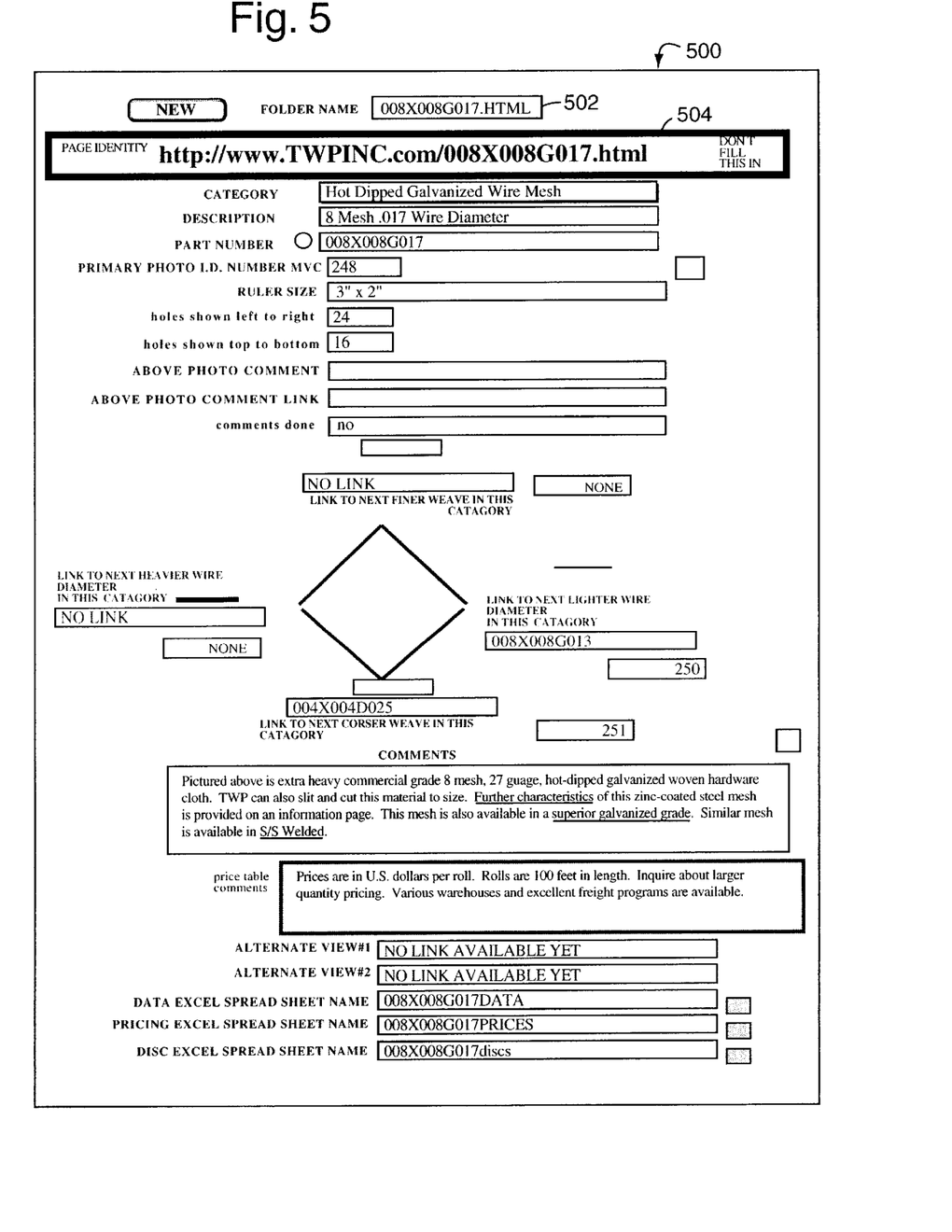
FIG. 5 is a diagram that represents a design form for a HTML product page, e.g., for a "008X008G017" wire-mesh product, and such is used as a tool for HTML coding.

FIG. 5 diagrams a form 500 that corresponds to the implementation of position 306 (FIG. 3). A folder name 502 is filled-in with "008X008G017.HTML", e.g., the hypertext mark-up language (HTML) file for 8×8 mesh galvanized 0.017" diameter. A URL 504 designates where the HTML file will be found on the Internet, e.g., ". . . /008X008G017.html". The rest of the form 500 is similar to that represented in FIG. 4.

Figure 6:
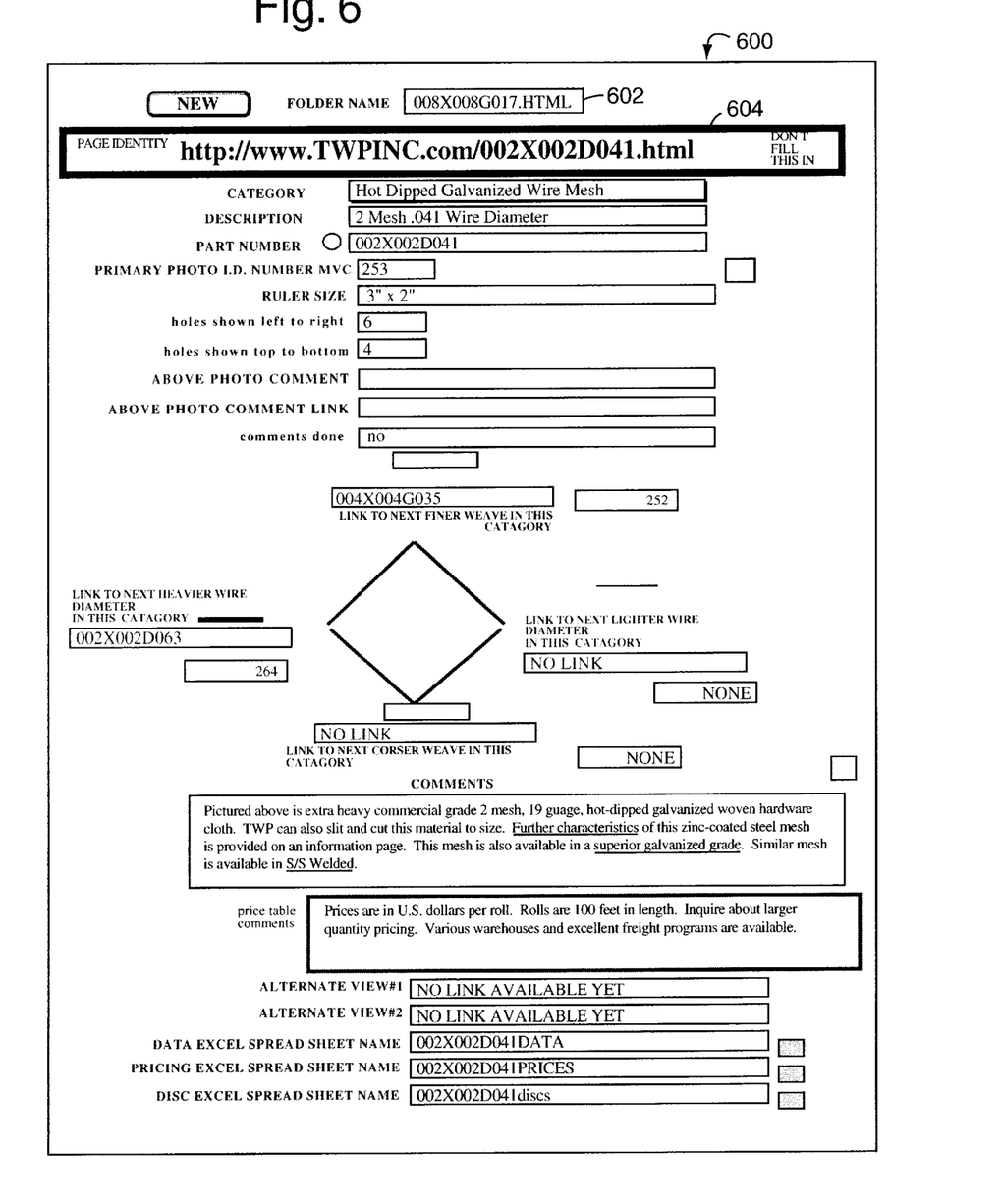
FIG. 6 is a diagram that represents a design form for a HTML product page, e.g., for a "002X002D041" wire-mesh product, and such is used as a tool for HTML coding.

FIG. 6 diagrams a form 600 that corresponds to the implementation of position 310 (FIG. 3). A folder name 602 is filled-in with "002X002G041.HTML", e.g., the hypertext mark-up language (HTML) file for 2×2 mesh galvanized 0.041" diameter. A URL 504 designates where the HTML file will be found on the Internet, e.g., ". . . /002X002G041.html". The rest of the form 600 is similar to that represented in FIG. 4.

Figure 7:
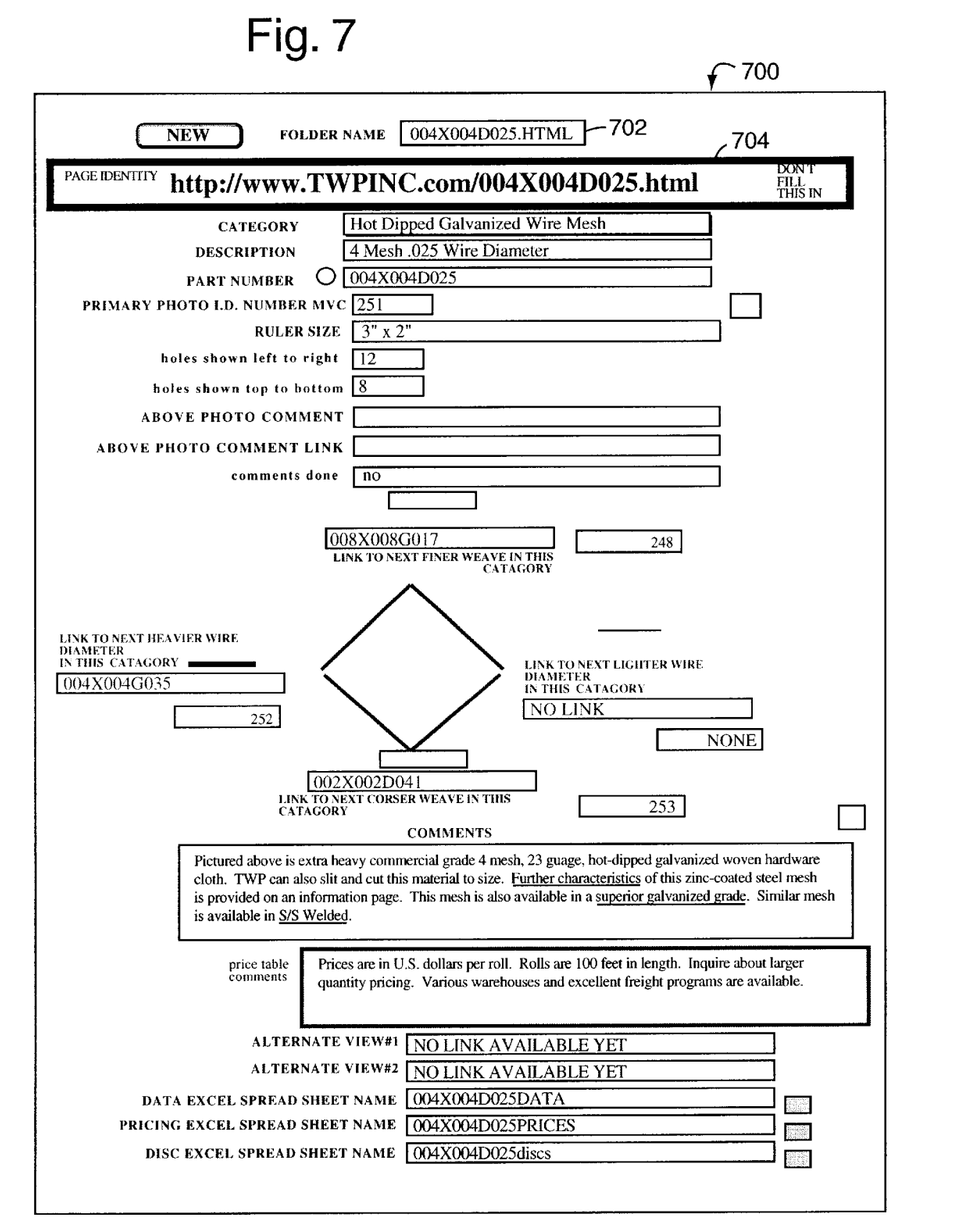
FIG. 7 is a diagram that represents a design form for a HTML product page, e.g., for a "004X004D025" wire-mesh product, and such is used as a tool for HTML coding.

FIG. 7 diagrams a form 700 that corresponds to the implementation of position 318 (FIG. 3). A folder name 702 is filled-in with "004X004D025.HTML", e.g., the hypertext mark-up language (HTML) file for 4×4 mesh galvanized 0.025" diameter. A URL 504 designates where the HTML file will be found on the Internet, e.g., ". . . /004X004D025.html". The rest of the form 700 is similar to that represented in FIG. 4.

Although the invention is preferably described herein with reference to the preferred embodiment, one skilled in the art will readily appreciate that other applications may be substituted for those set forth herein without departing from the spirit and scope of the present invention. Accordingly, the invention should only be limited by the Claims included below.

What is claimed is:

1. A wire-mesh selection Internet website system, comprising:

a webserver for connection to the Internet and providing for interactive webpages based on hypertext markup language (HTML);

a graphic user interface (GUI) based on an HTML wire-mesh-product page;

a wire-mesh product picture included in the GUI and representing a current wire-mesh product selection; and a four-way navigation control included in the GUI that permits an Internet-client user to hyperlink to other wire-mesh products.

2. The wire-mesh selection Internet website system of claim 1, wherein:

the four-way navigation control includes a button to hyperlink to a finer-mesh wire-mesh product selection.

3. The wire-mesh selection Internet website system of claim 1, wherein:

the four-way navigation control includes a button to hyperlink to a coarser-mesh wire-mesh product selection.

4. The wire-mesh selection Internet website system of claim 1, wherein:

the four-way navigation control includes a button to hyperlink to a thinner-wired wire-mesh product selection.

5. The wire-mesh selection Internet website system of claim 1, wherein:

the four-way navigation control includes a button to hyperlink to a thicker-wired wire-mesh product selection.

6. The wire-mesh selection Internet website system of claim 1, wherein:

the GUI includes a button to hyperlink to a wire-mesh product group constructed of brass.

7. The wire-mesh selection Internet website system of claim 1, wherein:

the GUI includes a button to hyperlink to a wire-mesh product group constructed of bronze.

8. The wire-mesh selection Internet website system of claim 1, wherein:

the GUI includes a button to hyperlink to a wire-mesh product group constructed of copper.

9. The wire-mesh selection Internet website system of claim 1, wherein:

the GUI includes a button to hyperlink to a wire-mesh product group constructed of galvanized metal.

10. The wire-mesh selection Internet website system of claim 1, wherein:

the GUI includes a button to hyperlink to a wire-mesh product group constructed of micronic material.

11. The wire-mesh selection Internet website system of claim 1, wherein:

the GUI includes a button to hyperlink to a wire-mesh product group constructed of sintered metal.

12. The wire-mesh selection Internet website system of claim 1, wherein:

the GUI includes a button to hyperlink to a wire-mesh product group constructed of welded stainless steel.

13. The wire-mesh selection Internet website system of claim 1, wherein:
   the GUI includes a button to hyperlink to a wire-mesh product group constructed of woven stainless steel.

14. The wire-mesh selection Internet website system of claim 1, wherein:
   the GUI includes a button to replace the wire-mesh product picture with an alternative view of a currently selected wire-mesh product.

15. The wire-mesh selection Internet website system of claim 1, wherein:
   the GUI includes a button to hyperlink to a price quotation of a currently selected wire-mesh product.

16. The wire-mesh selection Internet website system of claim 1, wherein:
   the GUI includes a button to hyperlink to an order form to place an order for a currently selected wire-mesh product.

17. The wire-mesh selection Internet website system of claim 1, wherein:
   the GUI includes a ruler to represent the scale of a currently selected wire-mesh product shown in the wire-mesh product picture.

* * * * *